United States Patent
Ertugrul

(10) Patent No.: US 10,204,347 B2
(45) Date of Patent: Feb. 12, 2019

(54) AUTHENTICITY CONTROL SYSTEM

(71) Applicant: Mehmet Ertugrul, Ankara (TR)

(72) Inventor: Mehmet Ertugrul, Ankara (TR)

( * ) Notice: Subject to any disclaimer, the term of this patent is extended or adjusted under 35 U.S.C. 154(b) by 190 days.

(21) Appl. No.: 15/051,651

(22) Filed: Feb. 23, 2016

(65) Prior Publication Data

US 2017/0046722 A1 Feb. 16, 2017

(51) Int. Cl.
*G06Q 30/00* (2012.01)
*H04B 5/00* (2006.01)

(52) U.S. Cl.
CPC ....... *G06Q 30/0185* (2013.01); *H04B 5/0056* (2013.01)

(58) Field of Classification Search
CPC .................. G06Q 30/0185; H04B 5/0056
See application file for complete search history.

(56) References Cited

U.S. PATENT DOCUMENTS

| 7,239,240 | B1 * | 7/2007 | How | G06K 19/0716 |
| | | | | 340/551 |
| 9,690,949 | B1 * | 6/2017 | Diorio | G06F 21/62 |
| 2003/0059050 | A1 * | 3/2003 | Hohberger | B41J 17/36 |
| | | | | 380/270 |
| 2003/0169149 | A1 * | 9/2003 | Ohki | G07C 9/00111 |
| | | | | 340/5.8 |
| 2005/0114270 | A1 * | 5/2005 | Hind | G06Q 20/367 |
| | | | | 705/64 |
| 2006/0077059 | A1 * | 4/2006 | Sako | G07D 7/0093 |
| | | | | 340/572.1 |
| 2006/0080819 | A1 * | 4/2006 | McAllister | G06K 17/00 |
| | | | | 29/403.3 |
| 2006/0173896 | A1 * | 8/2006 | Lyon | G06Q 10/08 |
| 2007/0146141 | A1 * | 6/2007 | Popplewell | G06K 19/07749 |
| | | | | 340/572.8 |
| 2007/0159400 | A1 * | 7/2007 | DeJean | H01Q 1/243 |
| | | | | 343/700 MS |
| 2007/0184670 | A1 * | 8/2007 | Koyama | H01L 27/1214 |
| | | | | 438/781 |
| 2007/0257104 | A1 * | 11/2007 | Owen | G06F 21/32 |
| | | | | 235/380 |
| 2008/0149584 | A1 * | 6/2008 | Martinelli | B65B 7/285 |
| | | | | 215/201 |
| 2008/0218348 | A1 * | 9/2008 | August | G06K 19/0717 |
| | | | | 340/572.1 |
| 2009/0085724 | A1 * | 4/2009 | Naressi | G06F 21/10 |
| | | | | 340/10.6 |
| 2009/0106042 | A1 * | 4/2009 | Maytal | G06Q 30/018 |
| | | | | 705/317 |
| 2009/0169019 | A1 * | 7/2009 | Bauchot | G06F 21/10 |
| | | | | 380/278 |

(Continued)

*Primary Examiner* — Blake J Rubin
(74) *Attorney, Agent, or Firm* — Inventa Capital PLC

(57) ABSTRACT

The invention relates to a system integrated to product labels in order to allow checking authenticity of products. The system of the present application comprises a near field communication (NFC) chip and a near field communication (NFC) chip antenna. The system is basically an integrated solution allowing checking whether a product with a label or barcode is original or not, by means of assigning parameters formed by novel encryption algorithms running on servers to NFC or RFID chips and then providing their online inquiry for preventing imitation of labels and barcodes.

4 Claims, 2 Drawing Sheets

(56) References Cited

U.S. PATENT DOCUMENTS

| | | | | |
|---|---|---|---|---|
| 2009/0322510 A1* | 12/2009 | Berger | G06Q 10/08 | 340/539.1 |
| 2010/0075666 A1* | 3/2010 | Garner | H04M 1/7253 | 455/426.1 |
| 2010/0140344 A1* | 6/2010 | Toofan | G06K 19/07703 | 235/375 |
| 2011/0191590 A1* | 8/2011 | Darbellay | G06F 21/645 | 713/175 |
| 2012/0154111 A1* | 6/2012 | Schattleitner | G06Q 10/08 | 340/5.8 |
| 2012/0185394 A1* | 7/2012 | Gelfand | G06Q 10/02 | 705/44 |
| 2012/0196529 A1* | 8/2012 | Huomo | G06Q 20/045 | 455/41.1 |
| 2012/0234908 A1* | 9/2012 | Wang | H04L 9/3268 | 235/375 |
| 2012/0290336 A1* | 11/2012 | Rosenblatt | H04B 5/00 | 705/5 |
| 2013/0187778 A1* | 7/2013 | Smith | G08B 13/2417 | 340/572.1 |
| 2013/0190897 A1* | 7/2013 | Junk | G05B 19/042 | 700/12 |
| 2013/0219481 A1* | 8/2013 | Voltz | H04L 63/20 | 726/9 |
| 2014/0025542 A1* | 1/2014 | Sharma | G06Q 10/08 | 705/28 |
| 2014/0067682 A1* | 3/2014 | Song | H04L 63/0853 | 705/44 |
| 2014/0070923 A1* | 3/2014 | Forster | G06K 7/10257 | 340/10.1 |
| 2014/0159900 A1* | 6/2014 | Joseph | G08B 13/2417 | 340/572.1 |
| 2014/0282947 A1* | 9/2014 | Ignatchenko | H04W 12/06 | 726/6 |
| 2014/0297545 A1* | 10/2014 | Prasad | G06Q 30/0185 | 705/318 |
| 2015/0106113 A1* | 4/2015 | Reddy | G06Q 30/0185 | 705/2 |
| 2015/0106282 A1* | 4/2015 | Lee | G06Q 10/087 | 705/318 |
| 2015/0106283 A1* | 4/2015 | Lee | G06Q 30/018 | 705/318 |
| 2015/0108211 A1* | 4/2015 | Higgins | G06K 5/00 | 235/375 |
| 2015/0127483 A1* | 5/2015 | Elliot | G06Q 30/0633 | 705/26.8 |
| 2015/0142683 A1* | 5/2015 | Guo | G06O 30/0185 | 705/318 |
| 2015/0187153 A1* | 7/2015 | Davis | G07C 9/00111 | 340/5.52 |
| 2016/0012498 A1* | 1/2016 | Prasad | G06Q 30/0601 | 705/26.1 |
| 2016/0100299 A1* | 4/2016 | Nawrocki | G06Q 30/018 | 455/414.1 |
| 2016/0210547 A1* | 7/2016 | Dekeyser | G06K 7/065 | |
| 2016/0300240 A1* | 10/2016 | Bright | G06Q 30/018 | |
| 2017/0032382 A1* | 2/2017 | Shulman | G06Q 30/06 | |
| 2017/0061183 A1* | 3/2017 | Houston | G06K 7/12 | |
| 2017/0195120 A1* | 7/2017 | Enguent | H04L 9/32 | |
| 2017/0200154 A1* | 7/2017 | Dubreucq | G06Q 20/3829 | |
| 2017/0223121 A1* | 8/2017 | Fisher | H04L 51/066 | |
| 2018/0107851 A1* | 4/2018 | Feldman | G06Q 30/0185 | |

* cited by examiner

AUTHENTICITY CONTROL SYSTEM

RELATED APPLICATIONS

This application claims priority to Turkish Patent Application number TR 2015/09941 filed on Aug. 11, 2015 and Turkish Patent Application number TR 2015/12016 filed on Sep. 30, 2015 and incorporated herewith by reference in its entirety.

SUBJECT OF THE INVENTION

The invention relates to a safe and easy-to-use control system enabling a consumer to inquire about authenticity of a purchased product. The present invention makes use of near field communication (NFC) and radio frequency identification (RFID) technologies.

BACKGROUND OF THE INVENTION AND THE STATE OF THE ART

Nowadays, imitation products are getting more and more common and it is getting harder to distinguish these products from the original ones. Imitation products are commonly found in garment, electronics etc. sectors as well as in cigarettes and alcohols. Consumers using some of these imitation products cannot get their money's worth, and for some of them, they encounter severe health problems, or even death.

Various countries have banderole regulations for preventing sales of imitation products and penalizing people who sell imitation products. Manufacturers of original products stick the banderoles provided to them by relevant institutions, on the products they manufacture. In this way, it is both made possible to ensure financial auditing and enable consumers to check the banderoles on the products they purchase, and thus raise awareness for using original products. However, security elements found on the presently used banderoles are quite inadequate. Presently used banderoles can easily be imitated and it becomes quite difficult for consumers to notice the difference.

Some improvements are already made, in order to reduce the imitability of the presently used banderoles and provide control systems that are more secure. Another example in the state of the art is the patent application No. WO 0129790 A1. A product control system is disclosed in the document. In the banderole placed on the products, visible numbers are found and among these numbers, various codes are inserted for various manufacturers, wherein the codes are so small that they cannot be seen with the naked eye. Although this improvement has more security elements than the banderoles already used in the prior art, it also has many disadvantages. One of these disadvantages is the difficulty of checking of these small codes found on the banderole which cannot be seen with the naked eye. Moreover, there is still a possibility for imitation product manufacturers to examine and copy these banderoles too, even though it would be harder than copying other prior art banderoles.

With the product according to the present invention, it is aimed to provide a system that is hard to imitate, easy to use by the manufacturer and the consumer, at the same time which also enables determination of used products in addition to imitation products, and makes things easier for the inspection mechanism.

BRIEF DESCRIPTION OF THE INVENTION

The invention is an electronic authenticity control system for preventing imitation, independently from the manufacturers, by using a near field communication (NFC) chip (1). The system consists of a near field communication (NFC) chip (1), hardware running the software that ensures communication with this chip, a novel singularity algorithm operating on local and regional servers, and a system allowing secure communication among the hardware. The most significant characteristic of the system is the production of the near field communication (NFC) chip (1) found in the system in a destructible manner, so that when the product, on which the (NFC) chip (1) is mounted for authenticity check, is used, the chip would lose its function and be left out of the system.

Special hardware servers on which the singularity algorithm works have a network structure that is protected against cyber attacks and can backup each other. There is a hardware-aided special software that runs the singularity algorithm on the servers. A security code is formed in an inimitable manner by using novel singularity algorithm reader device chip identity and parameters compiled from previously read values.

The hardware-aided special software running the singularity algorithm at least has the SSL 2048 seal. The control software comprises a module which stores information such as the location, type, and amount of the products determined as imitation product by the singularity algorithm, and when required, allows instant sharing of this information with law enforcers and other competent authorities. The whole process history of the singularity algorithm is stored in a specially protected database.

The invention is an integrated system performing the below given operations and during all of these operations, ensuring operation security and instantaneous control of data: Reading of the label or piece carrying the NFC chips via readers operated by special reader software produced by the system provider, and sending the read information to the special singularity algorithm in encrypted form, combining the near field communication (NFC) chip (1) number received at the servers with the previously read values found in the reader device information database, and thus formation of a new security code by the singularity algorithm, and rewriting of the read information back to the near field communication (NFC) chip (1) and at the same time transmitting the information of whether the product is original or fake/imitation to the hardware.

DETAILED DESCRIPTION OF THE INVENTION

In general terms, the invention is an online electronic authenticity control system. In more detail, it is an authenticity control system run through an NFC or RFID-compatible web, online, and system network for determining imitation products. The invention basically comprises a near field communication (NFC) chip system (3). The near field communication (NFC) chip system (3) comprises a near field communication (NFC) chip (1) and a near field communication (NFC) chip antenna (2).

In the present invention, the near field communication (NFC) chip (1) and the radio frequency identification (RFID) system are integrated into the banderoles or labels found on products. The producer activates the label through a provided system access point. During this activation, an unalterable identification number and inquiry variables assigned by the security system are installed into the near field communication (NFC) chip (1). These operations are performed over a 256-bit secure socket layer (SSL).

When a user wants to make an authenticity check on a product with a banderole comprising an activated near field communication (NFC) chip system (3), the product label is read by using software developed by a cellular phone, tablet etc. mobile device or another device supporting near field communication. The user is informed about the authenticity, production date, and other required information of the product by means of matching the information found on the label with the information found in the central server, through the internet. The servers are preferably independent from the producer and the product and they are controlled by the system provider. In order to increase system security during this operation, the media access control (MAC) address, internet protocol (IP) address, and near field communication (NFC) reader address information of the device performing the label reading operation is transferred to the central server. New security variables are formed at the central server and transferred to the label via the device. In this way, while security gaps such as copying of the variables are eliminated, at the same time, the information of by which device and at which date the label was scanned is also recorded. The novel software performing the transfer preferably has a SSL (secure socket layer) 2048 seal.

Figure 1:
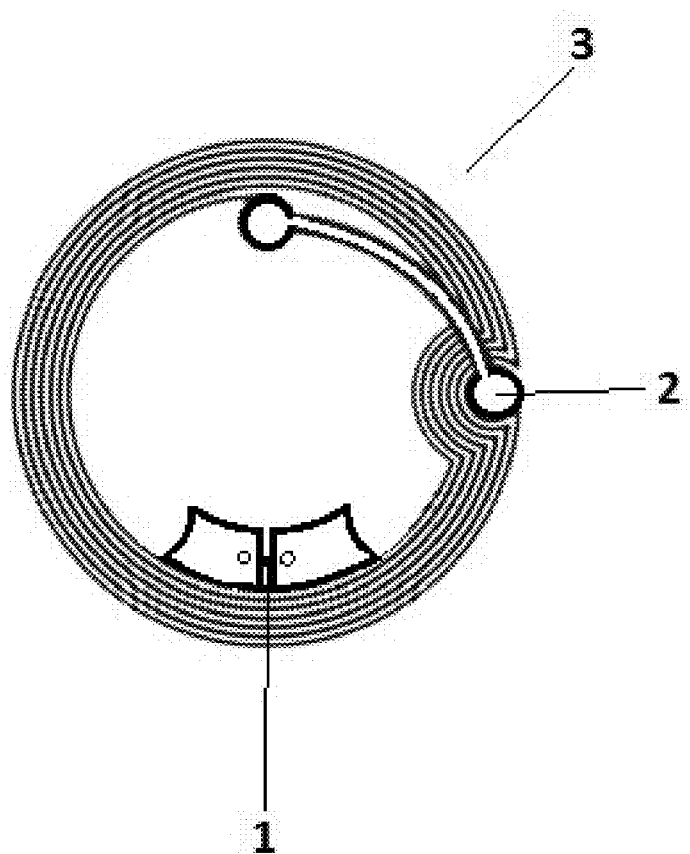
FIG. 1 is the schematic view of the near field communication (NFC) chip system.
Figure 2:
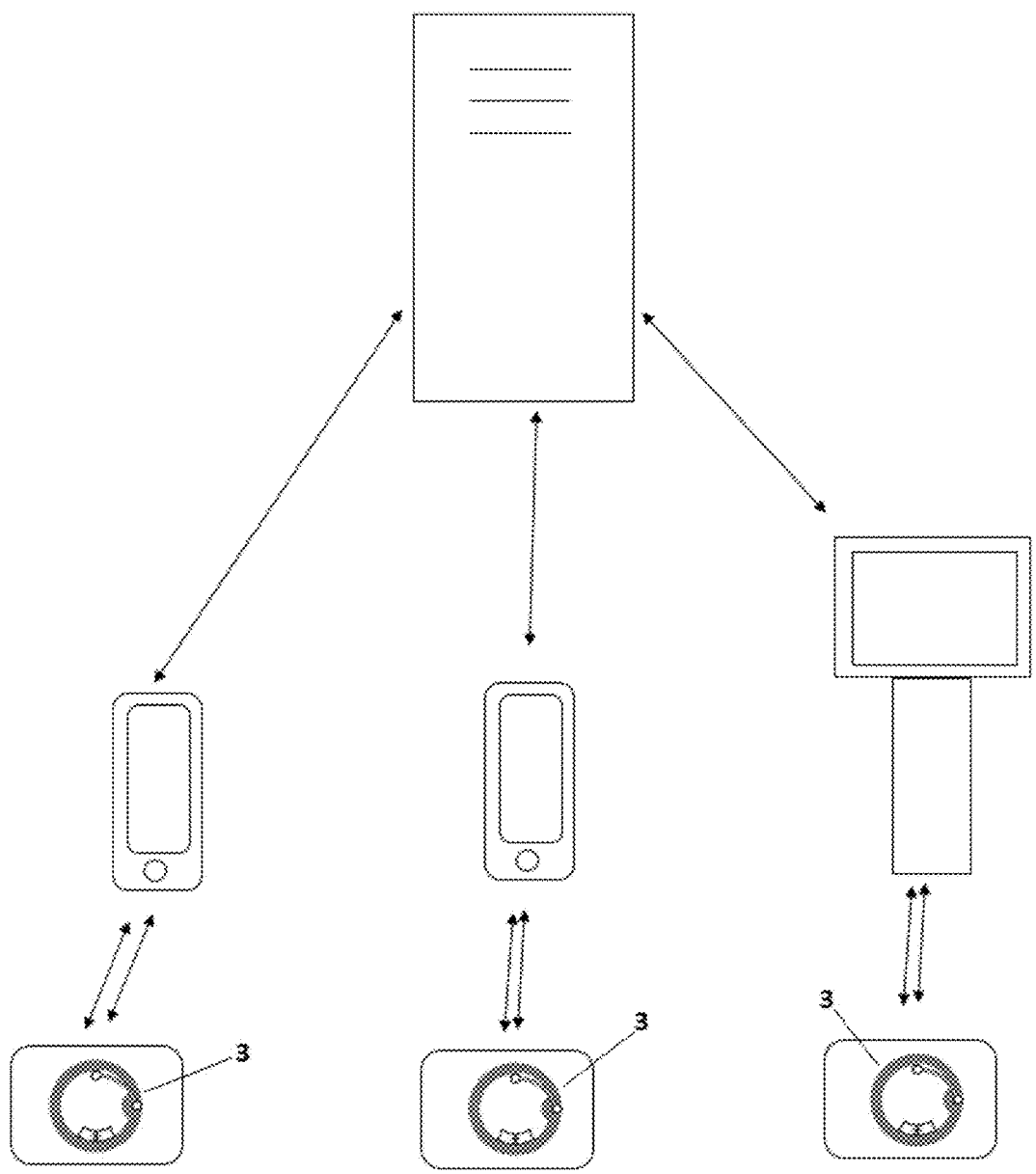
FIG. 2 is the schematic view showing connection of the near field communication (NFC) chip system to the server via devices.

The process flow scheme of the invention is shown in FIG. 2. In this way, the connection formed between the near field communication (NFC) chip system (3) and mobile phone, tablet etc. mobile devices or any other device compatible with near field communication and the connection formed between these devices and the server are schematically shown.

In the near field communication (NFC) chip system (3) used, in addition to the near field communication (NFC) chip (1), a near field communication (NFC) chip antenna (2) is also found. When the product of the system is used, the label comprising the near field communication (NFC) chip system (3) breaks up and the near field communication (NFC) chip antenna (2) and the near field communication (NFC) chip (1) are separated from each other. Therefore, the label loses its readability/scannability characteristic. In this way, used products can easily be determined. This system is especially a significant novelty for the fields of the lids of alcoholic beverage bottles.

The software providing communication between the near field communication (NFC) chip system (3) and the central server where the verification will be made comprises a module which stores information such as the location, type, and amount of the products determined as imitation product by the singularity algorithm, and when required, allows instant sharing of this information with law enforcers and manufacturers.

It is obvious that this system according to the present application would contribute to the prior art, since it is easy to use, secure, makes the work of inspection mechanisms easier, and allows access to the history of the product.

As a result, the invention is a system for the determination of authenticity of products, characterized in that; it comprises: a near field communication (NFC) chip (1), in which product information and product-specific codes are installed by a near field communication-compatible device, and from which this information can be read by a user via a near field communication-compatible device; a near field communication (NFC) chip antenna (2) connected to the near field communication (NFC) chip (1), and preventing performing of reading operation by getting separated from the near field communication (NFC) chip (1) as a result of a physical intervention, and thus allowing determination of a used device; and software providing communication between a near field communication (NFC) chip system (3), formed of said near field communication (NFC) chip (1) and near field communication (NFC) antenna (2), and the central server where the verification will be made.

Moreover, the method of the present invention is the operation method of a system enabling determination of authenticity of products, characterized in that; it comprises the operation steps of: activation of the label comprising the near field communication (NFC) chip system (3) by the provider through the system access point and installation of the variables generated by the novel encryption algorithm to the near field communication (NFC) chip (1); when a user wants to make an authenticity check on a product with a banderole comprising an activated near field communication (NFC) chip system (3), reading of the product label using software developed by a cellular phone, tablet etc. mobile device or another device supporting near field communication; informing the user about the authenticity, production date, and other required information of the product by means of matching the information found on the label with the information found in the central server, through the internet; transfer of the media access control (MAC) address, internet protocol (IP) address, and near field communication (NFC) reader address information of the device performing the label reading operation to the central server; formation of new security variables at the central server and transferring to the label via the device; and when the product comprising the system is used, separation of the near field communication (NFC) chip antenna (2) and the near field communication (NFC) chip (1) from each other, and the label losing its readability/scannability characteristic. An authenticity control system operating with said method and a device and/or devices comprising and running this authenticity control system are also within the scope of the present invention.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A near field communication (NFC) chip system for determination of authenticity of products, the system comprising:
 a NFC chip, pre-programmed by a NFC-compatible device, for containing product information and product-specific codes which can be read by a user via another NFC-compatible device wherein the NFC-compatible device of the user is a mobile phone, a tablet, or a personal digital assistant (PDA);
 a NFC chip antenna, connected to the NFC chip, for preventing the user from being able to read the pre-programmed product-specific codes as a result of the system determining that the product has previously been tampered with by being physically separated from the NFC chip by a physical intervention; and a central server, the central server comprising a software, a database, and a module for providing verification of the product-specific codes and transmitting product authenticity information to the NFC-compatible device of the user;

wherein the software provides communication between the NFC chip and the central server such that the central server receives media access control (MAC) address, Internet protocol (IP) address, and NFC reader address information of the NFC-compatible device of the user;

wherein the central server creates new product-specific codes, transmits the new codes to the NFC chip via the NFC-compatible device of the user, re-writes the codes into the NFC chip, and records authenticity information in the database; and wherein the module stores relevant information, the relevant information comprises location, type, and amount of products determined as imitation by the central server, into the database, and transmits the relevant information to law enforcement and product manufacturers.

2. The system according to claim 1, wherein the authenticity control system runs through an NFC or RFID-compatible web, online, and system network.

3. The system according to claim 1, wherein the software providing communication between the near field communication (NFC) chip system and the central server where the verification is made has an SSL (secure socket layer) 2048 seal.

4. A method of operation of a near field communication (NFC) chip system suitable for determination of authenticity of products, the method comprising:

activating a label of the NFC chip system by a sender of a product via a NFC-compatible system access point and installing a variable code generated by an encryption algorithm to a NFC chip located within the label;

reading the label by a recipient via another NFC-compatible device, wherein the NFC-compatible device of the recipient is a mobile phone, a tablet or a personal digital assistant (PDA);

determining, by a central server, whether the product has previously been tampered with as a result of the label losing its readability characteristic due to a NFC chip antenna breaking away from the NFC chip;

transmitting media access control (MAC) address, internet protocol (IP) address, and near field communication (NFC) reader address information of the recipient NFC-compatible device performing the label reading to the central server, generating, by the central server, at least one new security variable and transmitting the at least one new security variable to the label via the NFC-compatible device of the recipient, informing the recipient about authenticity, production date, and other information of the product by means of matching the information received from the label with information stored in the central server; and transmitting location, type, and amount of products determined as imitation by the central server to law enforcement and product manufacturers.

* * * * *